Sept. 15, 1931.         A. Y. DODGE         1,823,822
BRAKE
Filed Oct. 4, 1926

INVENTOR
ADIEL Y. DODGE
BY
M. W. McConkey
ATTORNEY

Patented Sept. 15, 1931

1,823,822

UNITED STATES PATENT OFFICE

ADIEL Y. DODGE, OF SOUTH BEND, INDIANA, ASSIGNOR TO BENDIX BRAKE COMPANY, OF SOUTH BEND, INDIANA, A CORPORATION OF ILLINOIS

BRAKE

Application filed October 4, 1926. Serial No. 139,389.

This invention relates to brakes and is illustrated as embodied in an internal expanding automobile brake. An object of the invention is to reduce the friction loss in applying the brake and to provide novel means for adjusting the brake.

An important feature of the invention relates to providing the brake shoes, or the ends of the equivalent friction device, with pairs of rollers engaging and preferably interlocking with spaced operating cams carried by a shaft or the like. In the arrangement shown in the drawings, the cams are relatively narrow and are received in grooves in the four rollers. Preferably means is provided for adjusting the rollers to compensate for wear of the brake, for example by mounting the rollers on pivots having eccentric portions engaging openings in the friction device, and which may be clamped by means such as set screws which hold them in any desired position of adjustment.

Another feature of the invention relates to providing an automatically adjusted stop for the friction means, in the form of a part which is frictionally gripped to resist its shifting and which is shifted from time to time as the brake wears by the force applied in the operation of the brake. In one very desirable arrangement, this engages the pivot connecting two of the shoes and is slotted to receive a novel friction clamp shown as carried by the backing plate of the brake.

The above and other objects and features of the invention, including various novel combinations of parts and desirable particular constructions, will be apparent from the following description of one illustrative embodiment shown in the accompanying drawings, in which.

Figure 1:
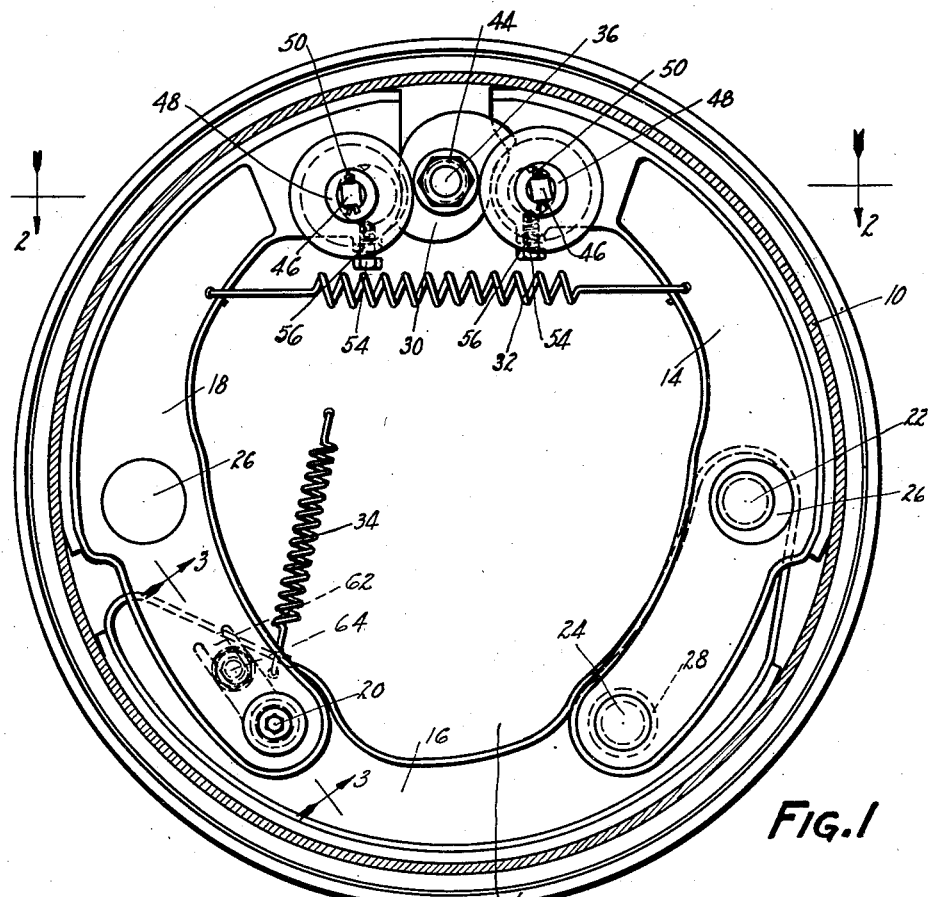
Figure 1 is a vertical section through the brake just inside the head of the brake drum and showing the brake shoes in side elevation.

The brake selected for illustration is of the same general type as that fully described in my Patent No. 1,567,716, granted Bendix Brake Company December 29, 1925, on my prior application. It includes a rotatable drum 10, at the open side of which is arranged a suitable backing plate or other support 12 and within which are arranged three shoes 14, 16, and 18. As fully explained in my above-identified patent, the shoes 14 and 18 are forked at their ends to straddle opposite ends of the shoe 16, shoe 18 being connected to shoe 16 by a pivot 20 and shoes 14 and 16 being anchored respectively on pivots 22 and 24. The pivot 22 passes through a relatively large opening 26 in the shoe 14, while the shoe 24 passes through a relatively large opening 28 in the shoe 16. In the form shown the shoes 14 and 18 are of the same construction and are interchangeable.

The brake is intended to be applied by means such as a novel double cam device 30, against the resistance of a return spring 32, the shoe 16 being applied by shoe 18 against the resistance of an auxiliary return spring 34.

According to one feature of the present invention, the cam device 30, which is shown in the form of a sleeve keyed or otherwise secured on a camshaft 36, is formed with two double edge cams 38 and 40 received in grooves in the four rollers 42 carried by the ends of the shoes 14 and 18 or their equivalents. The sleeve 30 formed with the two cams 38 and 40 is shown held against axial movement on the shaft 36 by a nut 44. The rollers 42 are grooved to receive the cams 38 and 40, thus interlocking with the cams to hold the shoes against lateral movement. Preferably the grooves in the rollers are slightly wider than the cams 38 and 40, the grooves being filleted at opposite sides so that the cams will automatically center themselves in the grooves. I prefer to mount the rollers 42 on pivots 46, the rollers being retained by washers 48 held by cotter pins 50. The pivots 46 have eccentric portions 52 received in openings in the webs of the shoes 14 and 18 and the rollers may be adjusted by turning the pivots on these eccentric portions. To facilitate this adjustment, the ends of the pivots 46 may be squared to receive a socket wrench. The pivots are secured in any desired position of angular adjustment by means shown as set screws 54 threaded through the lower parts of the webs of the shoes and which may be provided with suitable locknuts 56.

Figures 2, 3:
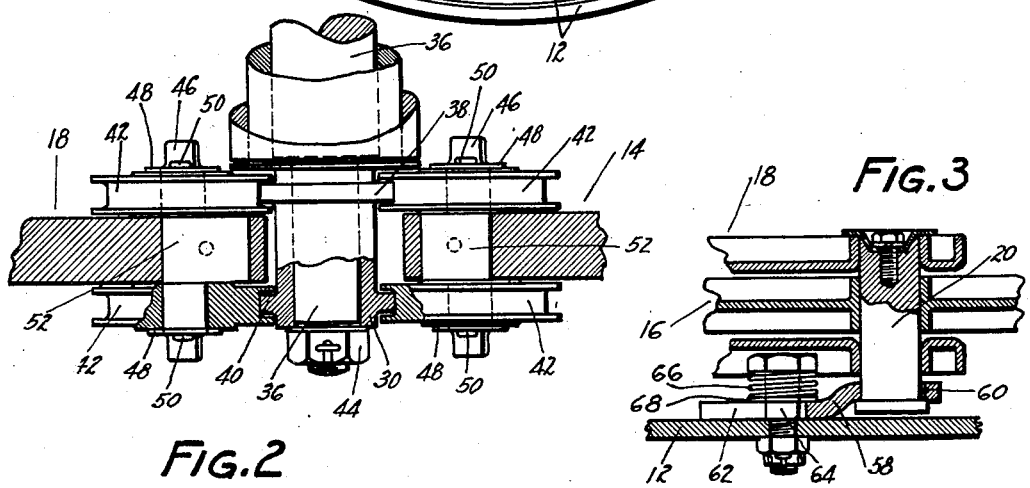
Figure 2 is a partial section on the line 2—2 of Figure 1 showing the rollers.
Figure 3 is a partial section on the line 3—3 of Figure 1 showing the automatic adjustment.

Another feature of the invention relates to automatically adjusting the idle position of the shoe 16, as the lining wears during the life of a brake, by a device shown in Figure 3. In one very simple and desirable form, this automatically adjusted stop device includes a part 58 having an opening for one end of the pivot 20 which is slightly larger than the diameter of the pivot, at least in the direction of movement of the pivot when the brake is applied. The clearance 60 so provided is equal to the desired backward movement of the shoe when the brake is released. Part 58 is forked to form a slot 62 embracing a bolt 64 carried by the backing plate 12. A coil spring 66, confined between the head of the bolt 64 and a friction washer 68 engaging part 58, serves to hold the stop part 58 frictionally clamped in any position to which it may be moved.

When the brake is applied, after taking up the clearance 60 the pivot 20 is moved until shoe 16 engages the drum, and drags the part 58 with it against the resistance of the friction washer 68 until the brake is fully applied. Then when the brake is released, the spring 34 pulls the shoe 16 away from the drum until the pivot 20 engages the opposite side of this opening in part 58, but as the spring 34 is not strong enough to shift the part 58 the shoe 16 is thus held in an idle position which is automatically determined by the amount of clearance provided at the point 60. This feature of the invention forms the subject matter of my divisional application Serial No. 520,776, filed March 7, 1931.

While one illustrative embodiment has been described in detail, it is not my intention to limit the scope of the invention to that particular embodiment or otherwise than by the terms of the appended claims.

I claim:

1. A brake having, in combination, a friction device having adjacent ends, a roller on each side of each end, and a rock member extending between said ends having two axially-spaced double cams engaging the four rollers.

2. A brake having, in combination, a friction device having adjacent ends, a roller on each side of each end, and a rock member extending between said ends having two axially-spaced double cams engaging the four rollers, the cams and rollers being formed to interlock to prevent lateral movement of said ends.

3. A brake having, in combination, a friction device having adjacent ends each provided with a pair of grooved rollers mounted on its opposite sides, and an angularly-movable brake-applying member between said ends having two axially-spaced ribs formed as double edge cams seated in the grooves of the four rollers.

4. A brake having, in combination, a friction device having its end provided with a pair of grooved rollers mounted on its opposite sides, and an angularly-movable brake-applying member having two axially-spaced ribs formed as edge cams seated in the grooves of the rollers.

5. A brake shoe having a cross opening adjacent its end, in combination with a pivot having an eccentric portion in said opening and a thrust roller carried by the pivot.

6. A brake shoe having a cross opening adjacent its end, in combination with a pivot having an eccentric portion in said opening and a thrust roller carried by the pivot, together with means for securing the pivot in the shoe with its eccentric portion in various angular positions.

7. A brake shoe having a cross opening adjacent its end, in combination with a pivot having an eccentric portion in said opening and a thrust roller carried by the pivot, together with a set-screw for securing the pivot in the shoe with its eccentric portion in various angular positions.

8. A brake shoe having a cross opening adjacent its end, in combination with a pivot having an eccentric portion in said opening and a pair of thrust rollers carried by the ends of the pivot.

In testimony whereof, I have hereunto signed my name.

ADIEL Y. DODGE.